United States Patent [19]

Miller

[11] Patent Number: 4,813,739
[45] Date of Patent: Mar. 21, 1989

[54] INFANT SEAT SUN VISOR

[76] Inventor: Laurie E. Miller, 1055 "B" Island Blvd., Fox Island, Wash. 98333

[21] Appl. No.: 145,301

[22] Filed: Jan. 19, 1988

[51] Int. Cl.$^4$ .............................................. A47C 7/62
[52] U.S. Cl. ..................................... 297/184; 297/250
[58] Field of Search ................................ 297/184, 250

[56] References Cited

U.S. PATENT DOCUMENTS

| | | | |
|---|---|---|---|
| 1,639,074 | 8/1927 | Blackwood | 297/184 |
| 1,923,517 | 8/1933 | Swaninger | 297/184 |
| 3,873,117 | 3/1975 | Perego | 297/184 |
| 4,195,879 | 4/1980 | Miller | 297/184 |
| 4,314,727 | 2/1982 | Potts | 297/184 |
| 4,579,385 | 4/1986 | Koenig | 297/184 |
| 4,583,779 | 4/1986 | Myers | 297/184 |
| 4,583,780 | 4/1986 | Finn | 297/184 |

Primary Examiner—Francis K. Zugel
Attorney, Agent, or Firm—Leon Gilden

[57] ABSTRACT

A portable sun visor is attachable to an infant car seat. The visor includes metal rods positionable in the car seat adjustable tilt assembly and further includes straps for facilitating a precise positioning of the visor over an infant.

1 Claim, 2 Drawing Sheets

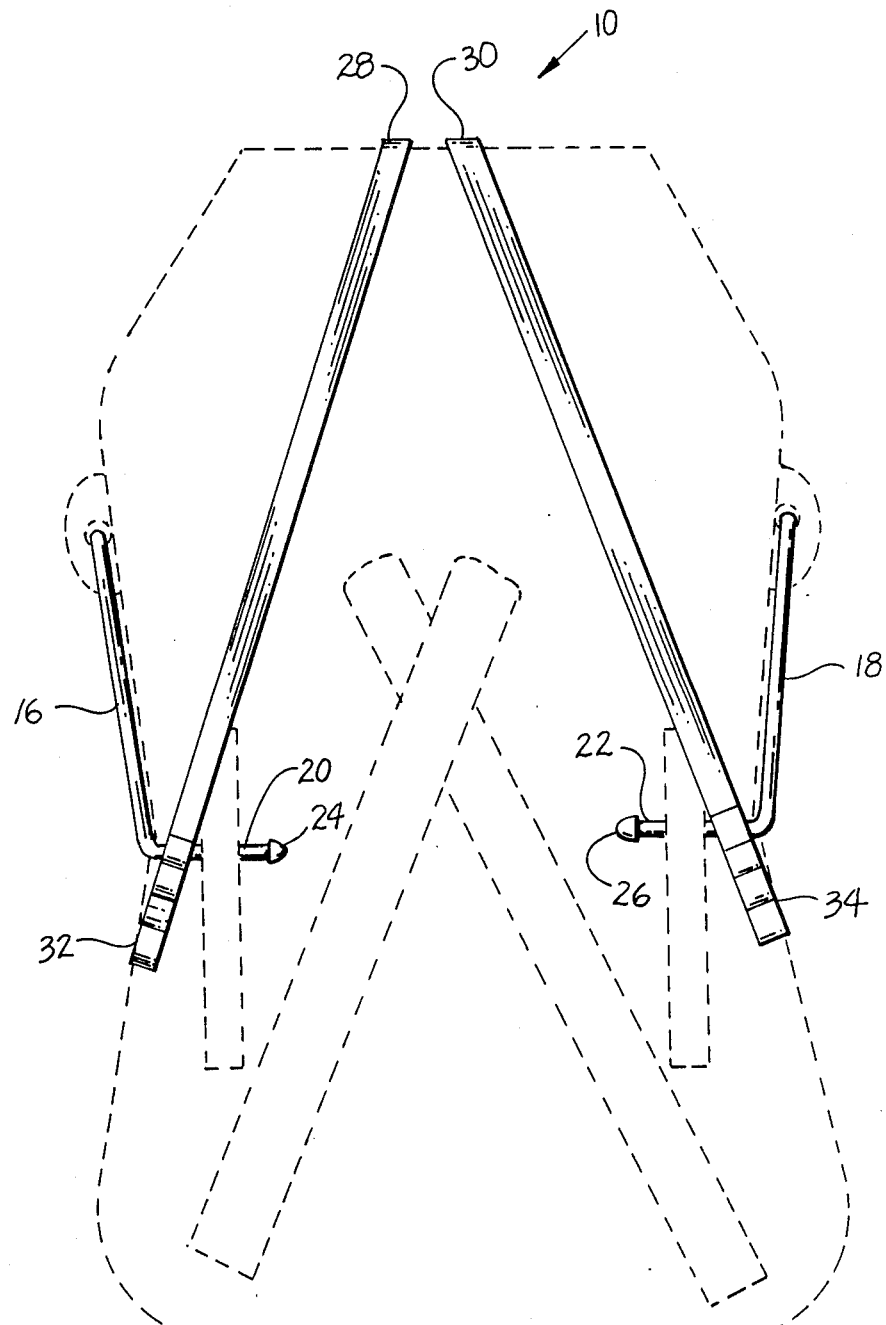

INFANT SEAT SUN VISOR

BACKGROUND OF THE INVENTION

1. Field of the Invention

The present invention relates to sun visors, and more particularly pertains to a new and improved portable sun visor which is easily and efficiently attachable to an infant car seat.

2. Description of the Prior Art

The use of sun visors which are adjustably positionable over an individual is well known in the prior art. However, there are apparently no commercially available visors which are adapted for use on infant car seats. In this respect, such sun visors would have to be relatively adjustable with respect to a car seat so as to provide shade for an infant seated therein and apparently, the expense and complexity of manufacturing such visors has precluded their commercial use. As such, it would appear that there exists a need for such visors wherein the same would be of a portable construction and could be efficiently and rapidly attached to a conventional infant car seat. In this respect, the present invention substantially fulfills this need.

SUMMARY OF THE INVENTION

In view of the fact that there are apparently no portable sun visors particularly adapted for use with infant car seats, the present invention provides for a portable sun visor wherein the same can be efficiently and rapidly attached to a conventional car seat while also providing for an adjustable positioning of the visor over an infant positioned within the seat. As such, the general purpose of the present invention, which will be described subsequently in greater detail, is to provide a portable sun visor which has all the advantages of prior art portable sun visors and none of the disadvantages.

To attain this, the present invention essentially comprises a curvilinearly-shaped sun visor having two downwardly extending pivotally movable rods which are positionable within the adjustable tilt mechanism of a conventional infant car seat. Additionally, two flexible straps are attached to a topmost portion of the sun visor and are extendable downwardly so as to be engagable with the aforementioned rods. The straps are adjustably movable with respect to the rods so as to obtain a desired positioning of the sun visor over an infant reclining in the car seat. In this respect, the straps hold the sun visor in a desired position relative to a topmost portion of the seat.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable sun visor which has all the advantages of the prior art portable sun visors and none of the disadvantages.

It is another object of the present invention to provide a new and improved portable sun visor which may be easily and efficiently manufactured and marketed.

It is a further object of the present invention to provide a new and improved portable sun visor which is of a durable and reliable construction.

An even further object of the present invention is to provide a new and improved portable sun visor which is susceptible of a low cost of manufacture with regard to both materials and labor, and which accordingly is then susceptible of low prices of sale to the consuming public, thereby making such portable sun visors economically available to the buying public.

Still yet another object of the present invention is to provide a new and improved portable sun visor which provides in the apparatuses and methods of the prior art some of the advantages thereof, while simultaneously overcoming some of the disadvantages normally associated therewith.

Still another object of the present invention is to provide a new and improved portable sun visor which is particularly adapted for use on an infant car seat.

Yet another object of the present invention is to provide a new and improved portable sun visor which is pivotally, adjustably attachable to an infant car seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a rear elevation view of the invention.

DESCRIPTION OF THE PREFERRED EMBODIMENT

Figure 1:
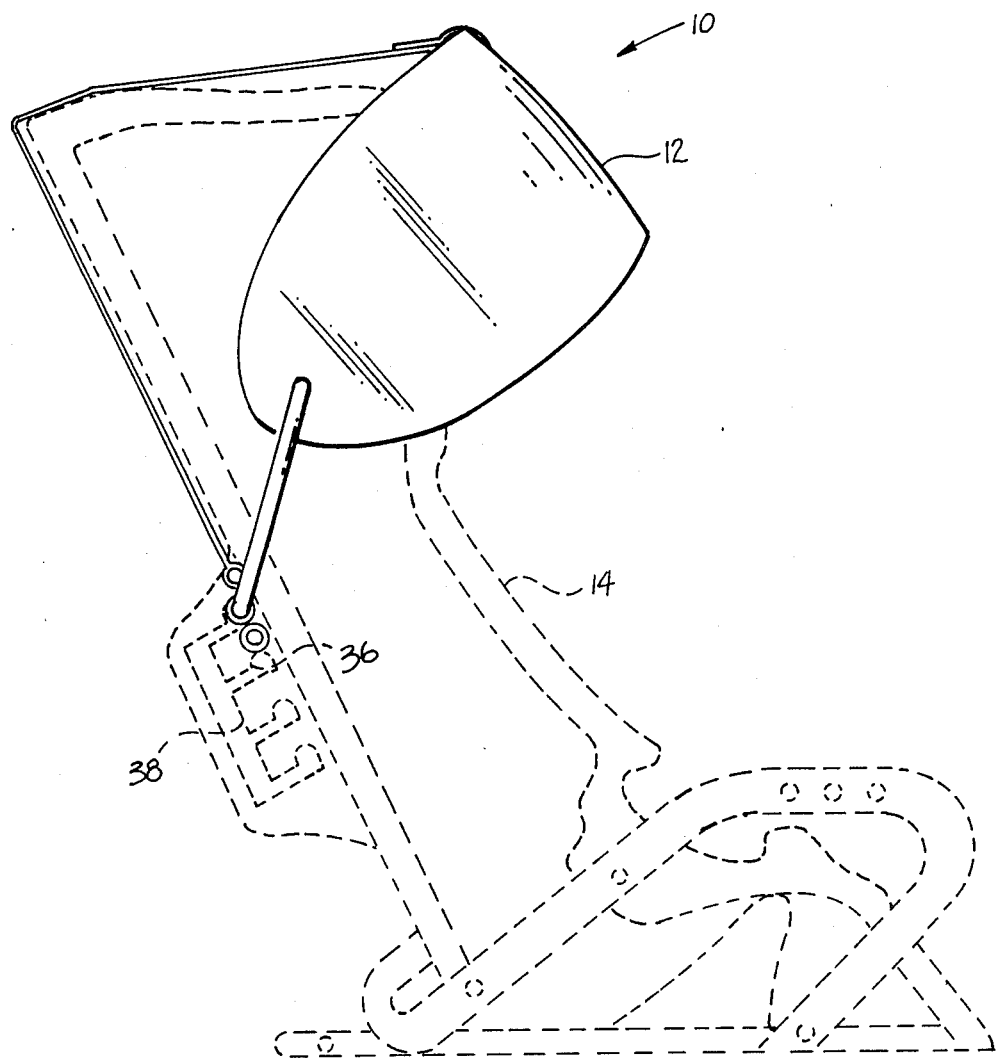
FIG. 1 is a side elevation view of the infant car seat sun visor comprising the present invention.

With reference now to the drawings, and in particular to FIGS. 1 and 2 thereof, a new and improved portable sun visor embodying the principles and concepts of the present invention and generally designated by the reference numeral 10 will be described.

More specifically, it will be noted that the portable sun visor 10 essentially comprises a curvilinearly-shaped sun shield 12 selectively adjustably positionable over a conventional infant car seat 14. The sun visor 12 could be formed from an opaque material so as to completely block the sun, or alternatively, it could be manufactured from a light filtering medium so as to provide the effect of sun glasses. As such, it is within the intent and purview of the present invention to manufacture the sun visor 12 from any known and conceivable material which would perform the intended purpose of the present invention. Accordingly, the claims appended hereto are intended to encompass all such conceivable materials.

With further reference to the drawings, it can be seen that the sun visor 12 includes a pair of pivotally attached rod members 16, 18 on opposed sides thereof. The rod members 16, 18 include respective inwardly directed portions 20, 22. The rod section 20 is provided with an attached rubber tip 24, while the rod section 22 is provided with a similar rubber tip 26.

Additionally, a pair of flexible straps 28, 30 are attached by some conventional means to a topmost portion of sun visor 12. The flexible strap 28 has a plurality of loops 32 sewn into a free end thereof, and the flexible strap 30 also has a plurality of such loops 34 formed on a free end thereof.

With respect to the manner of usage and operation of the invention 10, it can be appreciated that the sun visor 12 is attachable to an infant car seat 14 so as to provide shade to an infant seated therein. In this regard, the rod members 16, 18 are insertible within chosen slots 36 forming a part of a conventional adjustable tilt mechanism 38 associated with the infant car seat 14. To adjust the relative pivotal positioning of the sun visor 12, the straps 28, 30 are directed over a back portion of the car seat 14 with the rod sections 20, 22 being directed selected respective loops 32, 34 before such rod sections are adjustably positioned within the tilt mechanism slots 36. As such, the rod members 16, 18 effect an attachment of the sun visor 12 to a car seat 14, while the straps 28, 30 effect the adjustable relative positioning of the visor over an infant seated within the seat.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved portable sun visor for use on an infant car seat, said sun visor comprising:

visor means mountable over said car seat;

first attachment means for mounting said visor means to said car seat; and second attachment means for adjustably attaching said visor means to said car seat, said second attachment means also facilitating an adjustable positioning of said visor means over a child seated in said car seat, and wherein said first attachment means comprises a plurality of pivotally attached rod members connectable between said visor means and said car seat, and wherein said pivotally attached rod members are each adjustably positionable within a respective adjustable tilt mechanism forming a part of said car seat, and wherein said second attachment means comprises a plurality of flexible straps fixedly positionable between said visor means and said car seat, and wherein each of said flexible straps are provided with at least one loop on a free end thereof, and wherein each of said at least one loop is respectively attachable to each of said plurality of rod members to effect said positioning of said visor means over said child seated in said car seat, and wherein each of said at least one loop is respectively positionable over each of said rod members prior to each rod member being positioned in said adjustable tilt mechanism forming a part of said car seat.

* * * * *